(12) United States Patent
Stewart

(10) Patent No.: US 11,102,379 B2
(45) Date of Patent: Aug. 24, 2021

(54) METHOD AND APPARATUS FOR PROVIDING TIME SYNCHRONIZATION IN A DIGITAL TELEVISION SYSTEM

(71) Applicant: INTERDIGITAL MADISON PATENT HOLDINGS, SAS, Paris (FR)

(72) Inventor: John Sidney Stewart, Indianapolis, IN (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 38 days.

(21) Appl. No.: 15/760,566

(22) PCT Filed: Sep. 30, 2016

(86) PCT No.: PCT/US2016/054603
§ 371 (c)(1),
(2) Date: Mar. 15, 2018

(87) PCT Pub. No.: WO2017/069924
PCT Pub. Date: Apr. 27, 2017

(65) Prior Publication Data
US 2018/0262653 A1  Sep. 13, 2018

Related U.S. Application Data

(60) Provisional application No. 62/243,300, filed on Oct. 19, 2015.

(51) Int. Cl.
*H04N 5/04* (2006.01)
*H04L 27/26* (2006.01)
(Continued)

(52) U.S. Cl.
CPC ............. *H04N 5/04* (2013.01); *H04H 60/40* (2013.01); *H04L 1/0007* (2013.01);
(Continued)

(58) Field of Classification Search
CPC ............. H04N 5/04; H04N 5/40; H04N 5/455
(Continued)

(56) References Cited

U.S. PATENT DOCUMENTS

2010/0284425 A1  11/2010 Hood
2016/0359603 A1 * 12/2016 Fay ..................... H04L 65/4076

OTHER PUBLICATIONS

International Search Report for PCT/US2016/054603 dated Dec. 19, 2016.
(Continued)

*Primary Examiner* — Trang U Tran
(74) *Attorney, Agent, or Firm* — Volpe Koenig

(57) ABSTRACT

Methods (900, 1000) and apparatuses (110, 120, 400) are provided for transmitting and receiving a signal. The method (900) of transmitting a signal includes modulating (920) data into a plurality of modulation symbols to generate a signal, the data including time synchronization information including one of a time offset parameter and a frame length parameter selected according to a frame length mode parameter, and transmitting (930) the signal over a communication medium. The method (1000) of receiving a signal includes receiving (1010) a signal over a communication medium, and demodulating (1020) the signal to generate a plurality of demodulated symbols, the demodulated symbols including data, the data including time synchronization information including one of a time offset parameter and a frame length parameter selected according to a frame length mode parameter.

52 Claims, 6 Drawing Sheets

(51) Int. Cl.
*H04L 5/00* (2006.01)
*H04H 60/40* (2008.01)
*H04L 1/00* (2006.01)
*H04N 5/40* (2006.01)
*H04N 5/455* (2006.01)

(52) U.S. Cl.
CPC .......... *H04L 5/0092* (2013.01); *H04L 27/265* (2013.01); *H04L 27/2628* (2013.01); *H04L 27/2656* (2013.01); *H04L 27/2663* (2013.01); *H04L 27/2675* (2013.01); *H04N 5/40* (2013.01); *H04N 5/455* (2013.01)

(58) Field of Classification Search
USPC ............ 348/500, 724, 726, 723, 725, 423.1, 348/425.4
See application file for complete search history.

(56) References Cited

OTHER PUBLICATIONS

"ATSC S32=230-r56 Physical Layer Protocol (A/322), ATSC Proposed Standard: Physical Layer Protoco (A/322)," Jun. 29, 2016.
Advanced Television Systems Committee (ATSC); ATSC Candidate Standard: Physical Layer Protocol; S32-230r21; Sep. 28, 2015.

* cited by examiner

METHOD AND APPARATUS FOR PROVIDING TIME SYNCHRONIZATION IN A DIGITAL TELEVISION SYSTEM

CROSS-REFERENCE TO RELATED APPLICATIONS

This application claims the benefit, under 35 U.S.C. § 365 of International Application PCT/US2016/054603, filed Sep. 30, 2016, which was published in accordance with PCT Article 21(2) on Apr. 27, 2017 in English and which claims the benefit of U.S. provisional patent application No. 62/243,300, filed Oct. 19, 2015.

TECHNICAL FIELD

The present disclosure relates to communication systems and in particular to time synchronization in digital television systems.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

On Mar. 26, 2013, the Advanced Television Systems Committee (ATSC), which proposes terrestrial broadcasting digital television standards in the U.S., announced a call for proposals for the next generation (named ATSC 3.0) physical layer. ATSC 3.0 will provide even more services to the viewer and increased bandwidth efficiency and compression performance. This will require breaking backwards compatibility with the currently deployed version, ATSC A/53, which comprises an 8 level, Vestigial Sideband (8-VSB) modulation system. ATSC 3.0 is expected to emerge within the next decade and is expected to support delivery to fixed devices of content with video resolutions up to Ultra High Definition 3840×2160 at 60 frames per second (fps). The system is also expected to support delivery to portable, handheld and vehicular devices of content with video resolution up to High Definition 1920×1080 at 60 fps. Moreover, the system is expected to support lower video resolutions and frame rates.

One of the main issues associated with the current ATSC standard is the vulnerability of the 8-VSB modulation system to multipath propagation and Doppler Effect. These impairments are present in the broadcast transmission environment, particularly in large metropolitan cities, and in the delivery to portable/handheld/vehicular devices (which ATSC intends to support). There is a general consensus that multi-carrier modulation systems like, for example, the OFDM (orthogonal frequency division multiplex) modulation, are better choices of modulation to combat these impairments.

OFDM is a method of encoding digital data on multiple carrier frequencies. In OFDM, the sub-carrier frequencies are chosen so that the sub-carriers are orthogonal to each other, meaning that cross-talk between the sub-channels is eliminated and inter-carrier guard bands are not required. As a result, OFDM greatly simplifies the design of both the transmitter and the receiver; unlike conventional FDM, a separate filter for each sub-channel is not required. The orthogonality allows for efficient modulator and demodulator implementation using the FFT (Fast Fourier Transform) algorithm on the receiver side, and inverse FFT on the transmitter side. In particular, the size of the FFT identifies the number of carriers in the OFDM modulation system. Frequency selective channels are characterized either by their delay spread or coherence bandwidth. In a single carrier system such as 8-VSB, a single fade or interference can cause the whole link to fail, but in multi-carrier systems such as OFDM, only a few of the total sub carriers will be affected. As a result, multipath fading can be easily eliminated in OFDM, with simpler equalization techniques than in single carrier systems.

In most broadcast systems, including systems such as the proposed ATSC 3.0 system, the receiver and transmitter must, on average, be time locked to prevent data underflow or overflow in the receiver. The time locking or synchronization is particularly important for audio and video services where an underflow or overflow in a buffer may cause some disruption in the user experience. For the ATSC 3.0 system, the time locking or synchronization between the transmitter and receiver is proposed to be done by periodically transmitting a time value in the data stream. However, the new ATSC 3.0 standard also proposes to allow two modes of frame creation in generating the transmitted signal. Each of the frame creation modes will likely introduce different time recovery mechanisms. As a result, there is a need for an efficient time synchronization indication mechanism that may be used with both modes of frame creation. The present disclosure proposes such an indication mechanism.

SUMMARY

According to one aspect of the present disclosure, an apparatus for transmitting a signal is provided including a modulator that generates a signal by modulating data into a plurality of modulation symbols, the data including time synchronization information including one of a time offset parameter and a frame length parameter selected according to a frame length mode parameter, and a transmitter interface that transmits the signal over a communication medium.

According to one aspect of the present disclosure, a method of transmitting a signal is provided including modulating data into a plurality of modulation symbols to generate a signal, the data including time synchronization information including one of a time offset parameter and a frame length parameter selected according to a frame length mode parameter, and transmitting the signal over a communication medium.

According to one aspect of the present disclosure, an apparatus for receiving a signal is provided including a receiver interface that receives a signal over a communication medium, a demodulator that demodulates the modulated signal to generate a plurality of demodulated symbols, the demodulated symbols including data, the data including time synchronization information including one of a time offset parameter and a frame length parameter selected according to a frame length mode parameter.

According to one aspect of the present disclosure, a method of receiving a signal is provided including receiving a signal over a communication medium, demodulating the signal to generate a plurality of demodulated symbols, the demodulated symbols including data, the data including time synchronization information including one of a time offset parameter and a frame length parameter selected according to a frame length mode parameter.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
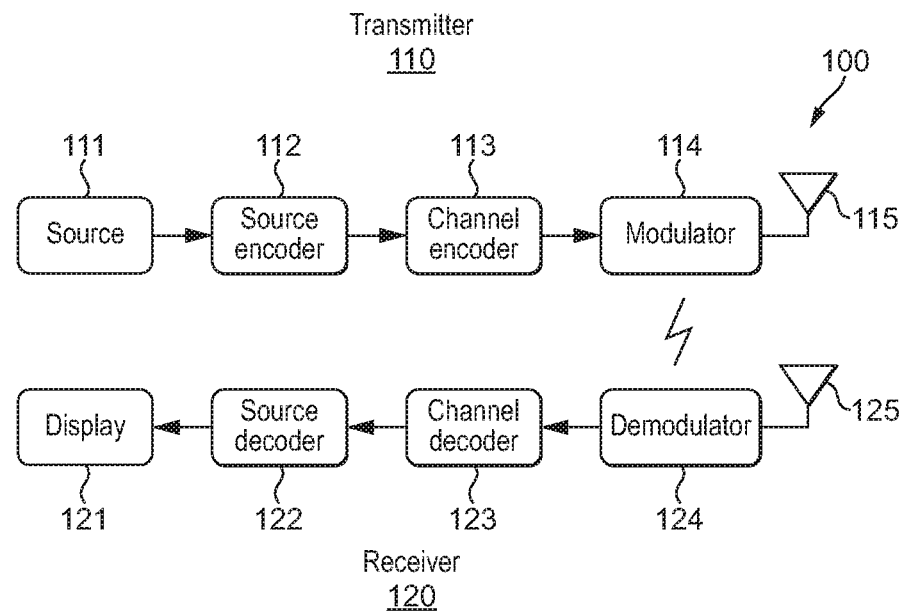
FIG. 1 illustrates a simplified block diagram of a general digital communication system according to an embodiment of the present disclosure.

The present disclosure relates to communication systems and in particular, to time synchronization in digital television systems. Several elements in connection with the present disclosure and discussed herein are well known and will not be described in detail. For example, familiarity with the second generation digital terrestrial television broadcasting system for Digital Video Broadcasting (DVB-T2) is assumed and not described herein. In this regard, the standards and recommended practices of the European Telecommunications Standards Institute (ETSI), such as ETSI EN 302 755 and ETSI TS 102 832 are not described herein. Also, familiarity with the current digital terrestrial television broadcasting system for the US (also known as ATSC) is assumed and not described herein. In this regard, the standards and recommended practices of ATSC A/53, A/153 and A/54 are not described herein.

It also should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example: a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 shows a simplified block diagram 100 of a general digital communication system according to an aspect of the present disclosure. Digital communication system 100 is applicable to the digital broadcasting channel, independent of the modulation system and system architecture. The transmitter device 110 may include the following components:

Source 111 for the audio, video, signaling or control and other ancillary data (e.g., program guide);

Source encoder 112, including audio and video encoders to compress the audio and video data;

Channel encoder 113 including at least some of the functions of randomizing, interleaving, channel coding and frame mapping to process the compressed, signaling and ancillary digital data for robustness and to add levels of error correcting encoding functionality;

Modulator 114 to convert the processed digital data into modulation symbols, which can be, for example, VSB (e.g., ATSC) or OFDM (e.g., DVB-T2). In addition, it includes the functionality of filtering and digital-to-analog (D/A) conversion; and Transmitter interface (e.g., antenna) 115 representing the functionalities of up-conversion, RF amplification and over-the-air broadcasting, or in general, representing transmission of a signal over a communication medium.

The transmitter 110 may further include a processor (not shown) and at least one memory (not shown). In one embodiment, the components 111-115 of transmitter 110 may be coupled to the processor and the at least one memory. The at least one memory may include transitory and/or non-transitory memory. The processor may monitor and control the various hardware components for implementing the functions of components 111-115. In another embodiment, the processor may execute software to perform the various functions for components 111-114.

At the receiver device 120 of FIG. 1, the inverse functions of the transmitter performed, including the following components:

Receiver interface (e.g., antenna) for reception 125, which includes the functionalities of over-the-air reception, RF down-conversion and tuning, or in general, representing reception of a signal over a communication medium;

Demodulator 124 to recover the digital data from the modulation symbols and includes the functionalities of analog-to-digital conversion (D/A), gain control, carrier and symbol timing recovery, equalization and header or preamble sync detection;

Channel decoder 123 to recover the compressed and ancillary data by performing the inverse functionalities of the channel encoder, including error correcting decoding, de-interleaving and de-randomizing;

Source decoder 122 to decompress the audio and video data, including video and audio decoders; and Display device 121 for audio/video viewing.

The receiver 120 may further include a processor (not shown) and at least one memory (not shown). In one embodiment, the components 121-125 of receiver 120 may be coupled to the processor and the at least one memory. The at least one memory may include transitory and/or non-transitory memory. The processor may monitor and control the various hardware components for implementing the functions of components 121-125. In another embodiment, the processor may execute software to perform the various functions for components 121-124.

A skilled artisan will appreciate that a source encoder 112 and/or a channel encoder 113, although common in general communications systems, are not essential for a system according to the present disclosure. Similarly, depending on the transmitter, a source decoder 122 and/or a channel decoder 123, although common in general communications systems, are not essential for a system according to the present disclosure. In addition, the transmitter and receiver may not require an antenna, if the transmission system is other than over-the-air (e.g., over cable). Furthermore, a receiving device includes, but is not limited to: a television, a set-top box, a computer, a mobile phone, an automobile receiver and a tablet.

System 100 may be adapted to generate, transmit, receive, and decode data and signals using an OFDM modulation format. The OFDM modulation is adopted in other digital terrestrial television standards, e.g., the DVB-T/DVB-T2 standards in Europe, and the ISDB-T standard in Japan. DVB-T, the first generation of European DTT (Digital Terrestrial Television), is the most widely adopted and deployed standard. Since its publication in 1997, over 70 countries have deployed DVB-T services and 45 more have adopted (but not yet deployed) DVB-T. This well-established standard benefits from massive economies of scale and very low receiver prices Like its predecessor, DVB-T2 uses OFDM (orthogonal frequency division multiplex) modulation with a large number of sub-carriers delivering a robust signal, and offers a range of different modes, making it a very flexible standard. DVB-T2 uses the same error correction coding as used in DVB-S2 and DVB-C2: LDPC (Low Density Parity Check) coding combined with BCH (Bose-Chaudhuri-Hocquenghem) coding, offering a very robust signal. The number of carriers, guard interval sizes and pilot signals can be adjusted, so that the overheads can be optimized for any target transmission channel. DVB-T2 offers more robustness, flexibility and at least 50% more efficiency than any other DTT system. It supports SD, HD, UHD, mobile TV, or any combination thereof. ATSC 3.0 is expected to encompass or adapt many of the elements found in DVB-T2.

Figure 2:
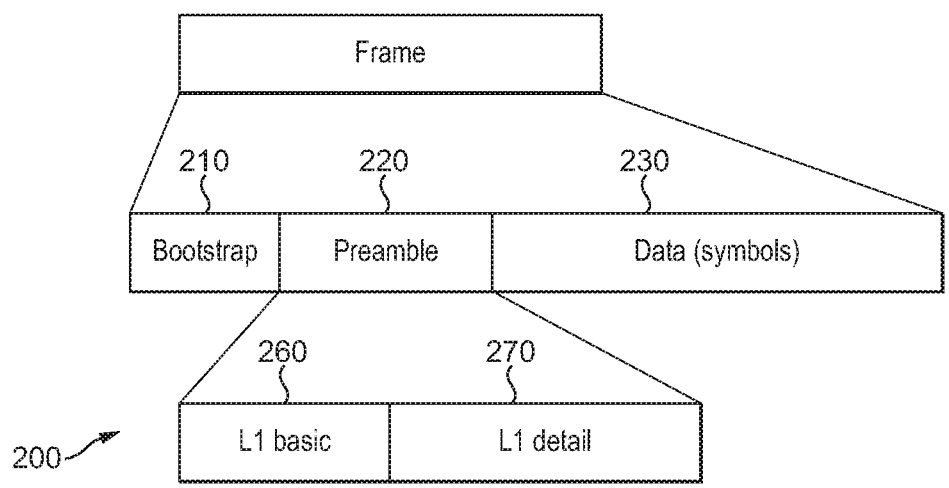
FIG. 2 illustrates the frame structure of a signal used in a communication system according to the present disclosure.

FIG. 2 shows a frame structure 200 for a signal used in a communication system according to the present disclosure, such as the ATSC 3.0 system. The frame structure 200 is composed of a bootstrap 210, followed by a preamble 220 and a data segment 230 composed of symbols. The data segment 230 may include non-signaling data. L1-signaling provides the necessary information to configure the physical layer parameters. The term "L1" refers to Layer-1, the lowest layer of the International Organization for Standardization (ISO) 7 layer model. L1 signaling consists of constraints on the bootstrap 210 and the preamble 220.

The bootstrap 210 consists of a number of symbols, beginning with a synchronization symbol positioned at the start of each frame period to enable signal discovery, coarse synchronization, frequency offset estimation, and initial channel estimation. The remainder of the bootstrap contains sufficient control signaling to permit the reception and decoding of the remainder of the frame to begin.

The preamble 220 may contain one or more preamble symbols which carry the control signaling applicable to the remainder of the frame. The FFT size, guard interval and scattered pilot pattern of the preamble symbols shall be signaled by the bootstrap 210. The preamble 220 further includes an L1 basic (L1B) segment 260 and an L1 detail (L1D) segment 270. The two segments L1B 260 and L1D 270 each consist of a plurality of parameters used as part of the signaling information which define the system, including modulation parameters, Forward Error Correction (FEC) parameters, frame size, etc. L1 basic 260 conveys the most fundamental signaling information of the system which is static over the complete frame and also defines the parameters needed to decode L1 detail 270. L1 detail 270 details the data context and the required information to decode it. The size of each of the L1B 260 and L1D 270 may vary depending on the amount of signaling information required in the system. It is to be understood that frame structure 200 may be adapted to other systems without distracting from the scope of the present disclosure.

As mentioned earlier, broadcast systems usually include a mechanism for time synchronization between the transmitter and the receiver. The time synchronization indication or value may be referenced to a particular point in the signal. For example, in ATSC 3.0, the reference location will be the start of the first symbol of the bootstrap 210, equivalent to the very beginning of an ATSC 3 frame. In order to provide the maximum accuracy with the minimum number of bits used in the transmitted time value, the ATSC 3.0 system can align the start of a frame on any one millisecond (ms) time boundary. As a result, the maximum resolution for the indication or reference indicator that needs to be sent in the data stream is a unit of milliseconds.

In one embodiment, the ATSC 3.0 system may create or generate frames using two different frame generation and sequencing modes. In a first mode, the frames are created such that they may be a multiple of five (5) milliseconds (ms) in length. Based on the 5 ms length, as long as the first frame is aligned to a one (1) ms boundary, all following frames will also be aligned on 1 ms boundaries. A value may be inserted into the frame (e.g., in preamble 220) to indicate the length of the current frame. The first mode is referred to as time aligned mode.

In a second mode of operation, frames may be created without respect to their time boundary locations. In this mode, the frame lengths may and likely will not be a multiple of 1 ms in length. As a result, even if the first frame is aligned to a 1 ms boundary, the following frames may not be aligned. In order for the time value to be sent correctly, the transmitter would need to leave unused spaces in the signal or data stream between frames to make sure that the start of any frames is always aligned on a 1 ms boundary. The unused space reduces transmission efficiency and lowers data transmission capacity. The second mode is referred to as symbol aligned mode.

The present disclosure adapts the use of the time synchronization indicator included in the frame (e.g., in preamble 220 in place of the information provided for the first mode) to address the operation of the second mode of operation. The mechanism adds some additional time information to the transmitted signal to allow the time to be correctly determined while still using all of the transmission capacity of the channel. Details regarding the additional time information and mechanism will be further described below.

Figure 3:
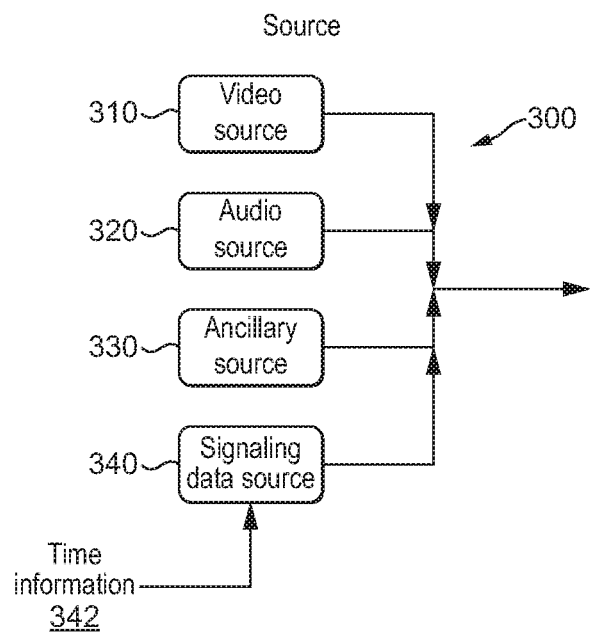
FIG. 3 illustrates an exemplary transmitter source according to the present disclosure.

FIG. 3 illustrates an embodiment of a source 300, such as source 111 described in FIG. 1. Source 300 includes video source 310, audio source 320, other ancillary data source 330 and a signaling data source or generator 340. The various sources may not be co-located and may be provided via various forms of data links (e.g., satellite, cable, microwave, etc.). The signaling data source is a function of the communication system and may have a number of fixed signaling parameters as well as variable signaling parameters which can be provided via a user interface or another type of input (e.g., a file, a remote data link).

According to the present disclosure, in one embodiment, the signaling data source receives time information 342 which identifies a time reference for the communication system. The time information 342 may be provided through an external source, such as an atomic clock. The time information 342 may also be provided through a network connection to a universal time base (e.g., National Institute of Science and Technology (NIST) weather radio station WWV or similar time source). The time information is to be included in the signaling data to allow for time locking between transmitter and receiver.

Depending on the system, the signaling parameters may or may not be channel encoded (in channel encoder 113). For example, in the original ATSC system, signaling data like the field and segment sync are not channel encoded. In contrast, in DVB-T2, all signaling parameters are channel encoded in the L1 pre and post signaling.

A modulator device, such as modulator 114 described in FIG. 1, may create a multi-carrier modulated signal, consisting of a sequence of modulation symbols, by allocating data to a plurality of carriers per modulation symbol, for signaling data and non-signaling data (video, audio, other ancillary data). In one embodiment of the present disclosure, the time reference and/or synchronization information parameters may be sent in a preamble (e.g., preamble 220 described in FIG. 2) or header symbol (e.g., in bootstrap 210 described in FIG. 2) for each frame of data, and may be used to indicate the timing of the transmission signal. Since two modes are used for frame generation, additional information may be provided and included in the preamble, for example, in the L1B portion of the preamble. In one embodiment, the length of the frame is specified as a 10 bit value, and referred to as the L1B_frame_length.

At the receiver side, for example, receiver 120, demodulation 124 is first performed to acquire the signaling data (e.g., from the bootstrap or preamble symbols) at a signaling data detector and set the receiver parameters accordingly. If the signaling data was channel encoded at the transmitter (at channel encoder 113), the signaling data detector must reside inside or after the channel decoder 123. If the signaling data was not channel encoded at the transmitter (at channel encoder 113), the signaling data detector may reside inside or after the demodulator 124. After the signaling data is recovered, the receiver extracts the various parameters contained in the signaling data to set its various modes of operation associated with its various data related blocks (including but not limited to modulation, e.g., constellation size, FFT size; FEC; interleaving; data distribution within the frame; etc.). The parameters are then sent to the various blocks in order for demodulation and decoding to be performed on the video, audio and other ancillary data.

Figure 4:
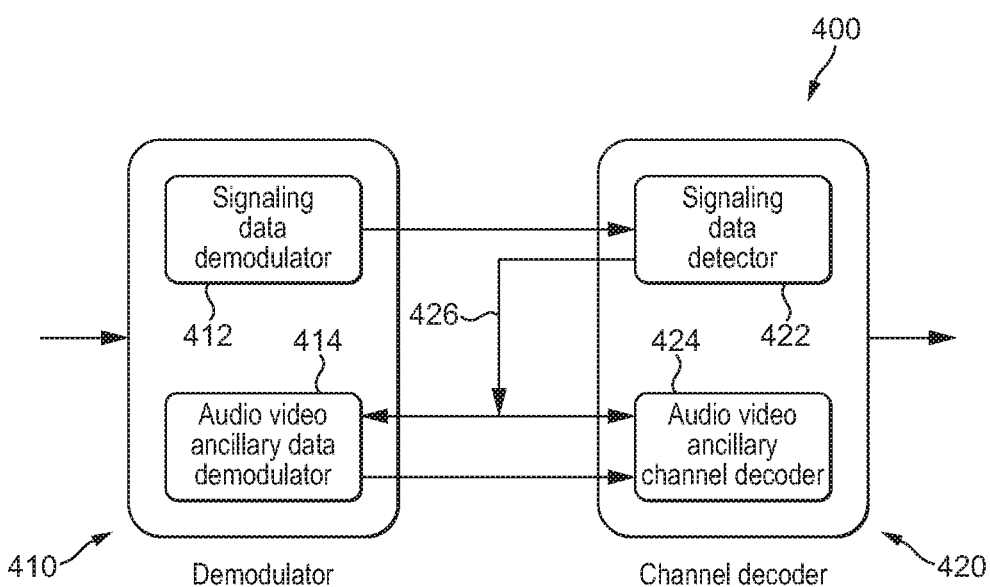
FIG. 4 illustrates an exemplary demodulator and channel decoder according to the present disclosure.

FIG. 4 shows an exemplary block diagram according to the present disclosure depicting a multi-carrier demodulator 410 and channel decoder 420. The demodulator 410, for all practical purposes, can be shown as composed of two blocks: the signaling data demodulator 412, which demodulates the signaling data symbols and sends the demodulated signaling data symbols to the signaling data detector 422. At the signaling data detector 422, the signaling data 326 is recovered from several potential levels of interleaving, randomizing and channel encoding for protection of the data against channel impairments. Once the signaling data 426 is recovered, it is then sent to other blocks of the receiver, including the audio/video/ancillary (non-signaling) data demodulator 414 and the audio/video/ancillary data channel decoder 424. These two blocks will demodulate and decode the audio, video and other ancillary (data other than signaling) data symbols as a function of the several signaling data parameters 426, including timing information parameters.

Figure 5:
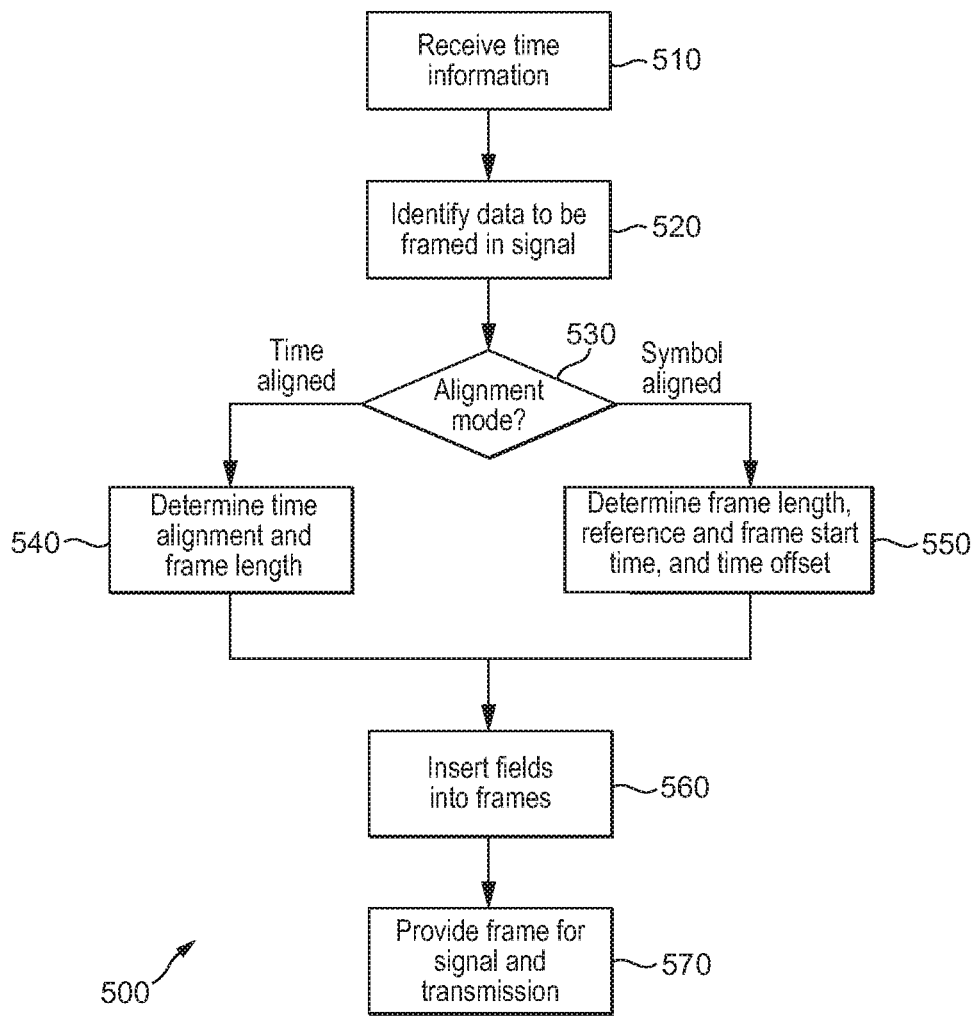
FIG. 5 illustrates a flowchart of a method for generating and transmitting a signal according to the present disclosure.

FIG. 5 shows a flowchart 500 of a method for generating and transmitting a signal including time synchronization information according to aspects of the present disclosure. Process 500 may be implemented in a transmitter, such as transmitter 110 described in FIG. 1. One or more steps in process 500 may also be implemented in a signaling data source element, such as signaling data source 340 described in FIG. 3.

Initially, at step 510, time information is received. The time information may be received through any known reference time source (e.g., a network time protocol server or WWV). Then, at step 520, data is identified to be included in a frame. Additionally, at step 520, any ancillary information, such as parameters related to the transmission or reception of the data, is identified and/or generated. ATSC 3.0, like many similar broadcast systems allow for a wide variety of parameters that may affect the transmission and reception of the data, including, but not limited to, FFT size, Channel BW, payload sample rate, Bootstrap length, Guard Interval size. Many of these parameters may affect the size or length of the data frame.

At step 530, a determination of frame alignment mode is made. If, at step 530, the frame alignment mode is time aligned mode, then, at step 540, a reference time and a frame start time (e.g., in ms) may be computed using the received time reference. Additionally, an indication of frame length may be determined. If, at step 530, a determination of symbol alignment mode is made, then at step 550, a reference time and a frame start time may be computed using the received time reference. However, in symbol alignment mode, the reference and frame start times may further require modification based on frame length. Additionally, a time offset value may be computed, in order to account for the more variable frame length in symbol aligned mode. Further details regarding the referencing data for the time aligned mode and symbol aligned mode will be described below.

At step 560, the additional signaling data generated either in step 540 or step 550 are inserted in the frame, along with the data. In one embodiment, the time reference signal is included in a first field or symbol of the frame (e.g., the bootstrap 210 in FIG. 2). In one embodiment, the indication of offset, either as a frame length for time aligned mode or a frame offset (or time offset, or frame time offset) for symbol aligned mode, may be included in the preamble (e.g., L1 Basic 260 in FIG. 2). It is important to note that in one embodiment, the same field in the same location in the frame and occupying the same number of bits is used to convey information associated with time aligned frames in one mode and symbol aligned frames in a second mode. At step 570, the frame, complete with data and signaling information, is provided for inclusion in a signal used for transmission to a receiving device.

Figure 6:
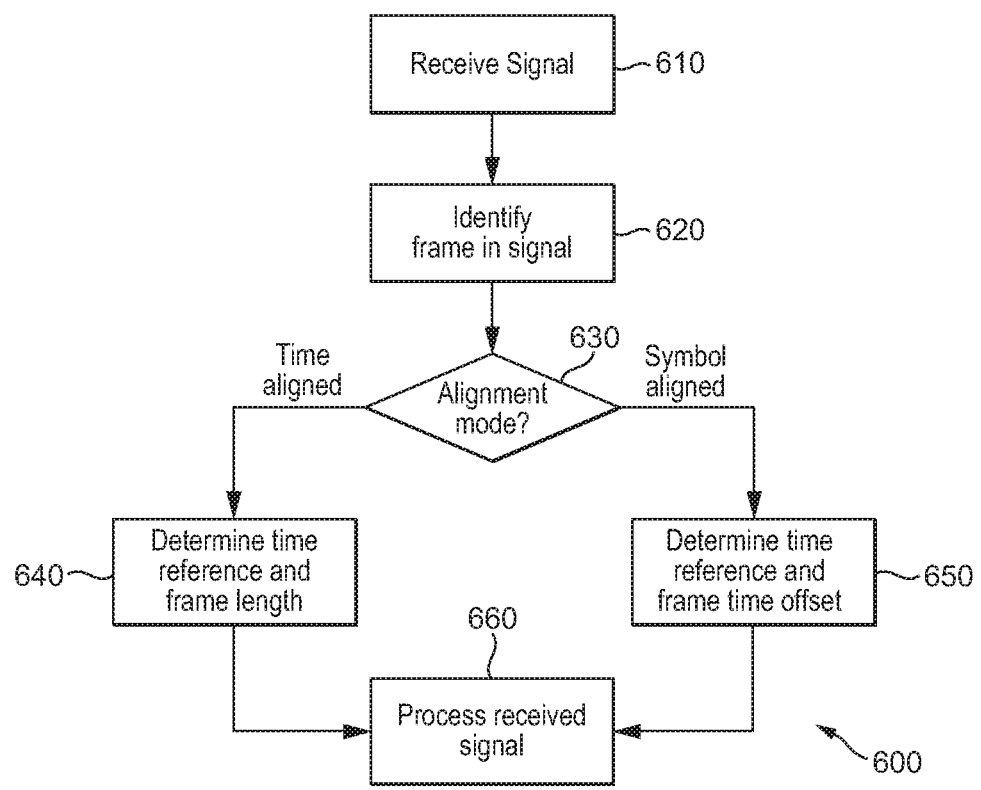
FIG. 6 illustrates a flowchart of a method for receiving a signal and decoding time synchronization information according to the present disclosure.

FIG. 6 shows a flowchart for a process 600 for receiving a signal and decoding time synchronization information according to aspects of the present disclosure. Process 600 may be implemented in a receiver, such as receiver 120 described in FIG. 1. One or more steps in process 600 may also be implemented in a signaling data detector, such as signaling data detector 422 described in FIG. 4.

At step 610, a signal is received. The signal includes data and signaling information that is arranged in frames and has been encoded and modulated. At step 620, one or more frames are identified in the received signal. The identification, at step 620, may include any demodulation or initial decoding needed to identify the one or more frames. Also, at step 620, the bootstrap and/or preamble portions of the frame may be identified and decoded as necessary to recover any signaling information including, but not limited to, time synchronization information.

At step 630, a determination for the frame alignment mode is made based on the signaling information. In one embodiment, the preamble is decoded to determine the signaling information associated with one of two frame alignment modes, time aligned mode and symbol aligned mode.

If, at step 630, a determination is made that the received signal is using time aligned mode, then, at step 640, the time reference and the frame length information are extracted from the frame (e.g., from the bootstrap and preamble). If, at step 630, a determination is made that the received signal is using symbol aligned mode, then, at step 650, the time reference and the frame time offset information are extracted from the frame (e.g., from the bootstrap and preamble). It is important to note that the time reference information for time aligned mode and symbol aligned mode may both be units of ms, their values are likely different and further represent a different time point relative to the frame. The difference in time relative to the frame is associated with, and accounted for by, the frame length information for the time aligned mode and the frame time offset information for symbol aligned mode. By providing different information for the two modes but in the same data format, the two modes may achieve similar transmission efficiency while using the same signaling information fields.

At step 660, the signaling information determined in either step 640 for time aligned mode or step 650 for symbol aligned mode is used to further process the current and future frames in the received signal.

Figure 7:
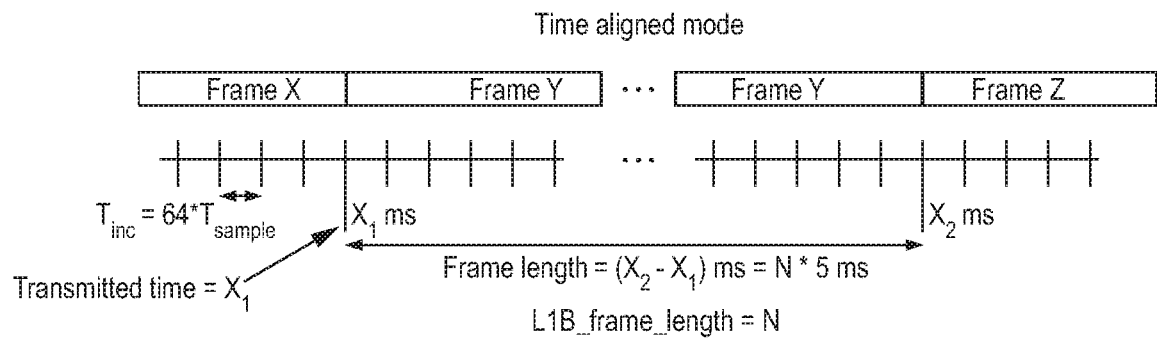
FIG. 7 illustrates a series of frames provided in the time aligned frame mode according to the present disclosure.

FIG. 7 illustrates a series of frames provided in the first or time aligned frame mode as described in the present disclosure. In the time aligned frame mode, the start of the frames will be aligned on one (1) ms boundaries. The alignment may be done by aligning the first output frame on a one (1) ms boundary. All following frames will then also be aligned to 1 ms boundaries. The transmitted reference time value will point to the beginning of the first symbol of a frame bootstrap and the L1B_frame_length field is used to indicate the current frame length. An exemplary L1B_frame_length field is shown below based on the time aligned frame mode:

i. L1B_frame_length_mode 1 bit
ii. L1B_frame_length 10 bits

Other numbers of bits different than the ones in items i and ii above may be used for L1B_frame_length_mode and L1B_frame_length without departing from the scope of the present disclosure.

Figure 8:
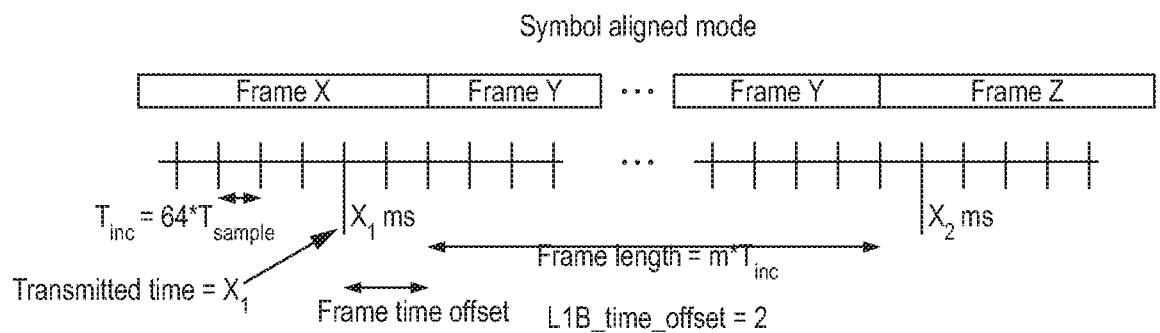
FIG. 8 illustrates a series of frames provided in the symbol aligned frame mode according to the present disclosure.

FIG. 8 illustrates a series of frames provided in the second or symbol aligned frame mode as described in the present disclosure. In the symbol aligned frame mode, the first output frame is aligned to a 1 ms boundary, similar to time aligned symbol mode. Due to the granularity of frame lengths available in the less constrained symbol aligned frame mode, the start of all following frames are aligned on a boundary indicated by a value Tinc, that is not necessarily on a 1 ms boundary. The transmitted reference time value will point to the closest 1 ms boundary that is on or before the beginning of the first symbol of a bootstrap portion (e.g., bootstrap 210 in FIG. 2) of the subsequent frame.

Not every frame length is possible in the ATSC 3.0 standard. The possible frame lengths may be defined by the following equation:

$$\text{frame\_length} = (\text{data frame size} + \text{guard interval})/\text{sample\_rate} \quad (1)$$

where the data frame size may be, e.g., 8K, 16K or 32K, and the guard interval may be, e.g., 192, 384, 512, 768, 1024, 1536 or 2048. In one embodiment, the value 1K may be equal to 1024. In one embodiment, the value 1K may be equal to 1000.

Since the possible frame length values may be divisible by 64, they can be described by:

$$\text{frame\_length} = X*64/\text{sample\_rate} \quad (2)$$

where X is a 10 bit number and Tinc=64/sample_rate identifies the granularity of the frame length.

Hence, if a modulator starts off on a (ms) boundary, then any subsequent time offsets from (ms) boundaries may be described by sending the value of X as described above in the data stream.

One can also conclude from equation (2) that any offset from the millisecond boundaries may be described as a function of the sample rate, i.e., inversely proportional to the sample rate. More specifically, the frame length and any offset may be expressed in units of a sample period, where sample_period=1/sample_rate.

The sample rate post bootstrap, also called baseband sample rate (BSR) may be given by:

$$\text{sample\_rate} = (N+16)*0.384 \text{ MHz} \quad (3)$$

where N is the signaled value and may be in the range from 0 to 80, inclusive. Values of 81 to 127 may be reserved.

The constant N in equation (3) is the baseband sample rate coefficient (bsr_coefficient). Table 1 shows examples of bsr_coefficient and corresponding sample rates (or BSR) according to equation (3) above.

TABLE 1

| bsr_coefficient | BSR (MHz) |
|---|---|
| 2 | 6.912 |
| 5 | 8.064 |
| 8 | 9.216 |

The frame time offset (also called L1 B_time_offset) indicator used in the time aligned frame mode is used to indicate the time interval from the reference time value to the start of the bootstrap symbol in Tinc units. It is important to note that not any arbitrary frame length is possible. The necessary resolution and data size to accommodate the proper time interval for a frame may be determined based on the following and based on the operational parameter limits present for ATSC 3.0:

Frame lengths have a granularity of Tinc=64/BSR (baseband sample rate).

Tinc is the largest time interval that divides evenly into the FFT size and GI length.

Tinc also divides evenly into all possible bootstrap lengths (e.g., 0.5 ms increments) and into the 1 ms proposed transmitted reference time value resolution.

To accurately describe the start time of a frame requires a resolution of Tinc for an arbitrary case.

This is a finer granularity than that provided by the 1 ms resolution of the proposed transmitted reference time value.

As a result, Tinc requires up to 10 bits of resolution at maximum BSR.

In one embodiment, the maximum value needed is a value of 575 at maximum sample rate.

The location of the start of the bootstrap may be determined in a receiver device by adding (L1B_time_offset*Tinc) to the received reference time value. An exemplary L1B_frame_length field receiving mechanism using the same 11 bit structure and location in the preamble of the field as described earlier and including the aspects of the present disclosure is shown below:

L1B_frame_length_mode (1 bit)

If L1B_frame_length_mode (value)=0

L1B_frame_length (10 bits)

else

L1B_time_offset (10 bits) \quad (4)

The expression (4) above indicates that only two parameters are included in the datastream, depending on the value of the L1B_frame_length_mode parameter. The first parameter included in the datastream is the L1B_frame_length_mode parameter. When the L1B_frame_length_mode_parameter=0, that is, when the frame is time aligned (to a 1 ms boundary), the L1B_frame_length parameter is also included in the datastream. On the other hand, when the L1B_frame_length_mode parameter=1, that is, when the frame is symbol aligned, the L1B_time_offset parameter is included in the datastream. By sending either L1B_frame_length or L1B_time_offset (or equivalently, one of L1B_frame_length and L1B_time_offset) according to the value of the L1B_frame_length_mode parameter, one avoids sending unnecessary data and obtains savings in data rate. Other numbers of bits different than the ones specified above may be used for L1B_frame_length_mode, L1B_frame_length and L1B_time_offset without departing from the scope of the present disclosure.

In one embodiment of the present disclosure, the parameters in expression (4) above are included in a preamble of a current frame and refer to the current frame, that is, describe the current frame mode, for a frame structure as described in FIG. 2. In one embodiment of the present disclosure, the parameters in expression (4) above are included in a preamble of a current frame and refer to the next frame, that is, describe the frame mode associated with the next frame, for a frame structure as described in FIG. 2.

In one embodiment, the time synchronization information may be used to adjust a system clock in the receiver with the transmitter clock. The adjustment may help prevent disruption for audio and video services at the receiver, since an underflow or overflow in a buffer may cause disruption in the user experience.

The multimedia content (e.g., video and/or audio) should be presented to the viewer in an orderly fashion. There are two main timing issues that may be considered. First, the audio and video components should be synchronized such that they are correctly lip synchronized (or synced). Second, in the case where there are multiple presentation devices in close proximity to each other, the presentation should be done at the same time. This is to prevent such problems as hearing from a neighbor's television that a goal was scored when on your device it has not yet occurred.

According to the present disclosure, the control of the presentation time may based on two main items. The first item is data that is transmitted along with a multimedia segment (e.g., audio or video) that gives the time at which this segment should be presented in real time (e.g., presentation timestamp). The presentation time data may be generated according to any transport standard, e.g., Moving Picture Experts Group 2 (MPEG-2), MPEG Media Transport (MMP), Real-Time Object Delivery over Unidirectional Transport (ROUTE)/DASH, etc.

The second item on which the control of the presentation time may be based is a real time clock (or system clock) within the receiver that is locked to an atomic clock source. The synchronization of the real time clock within the receiver has several components. The first component is the fact that the transmitted sample clock is locked to an atomic time clock source. The synchronization allows the receiver to lock the receiver internal sample clock to the transmitted sample clock and gives the receiver an internal clock whose frequency is locked to an atomic time source. The timing information is used to adjust the receiver free running clock.

In the process of receiving a frame, the receiver adjusts the receiver sampling clock so that the frame is correctly captured. The sampling clock edge may be aligned with the start of the bootstrap and also the start of the frame. The alignment may be performed by using an analog VCO or using digital interpolation. Also, in processing a frame, the receiver may need to keep track of the sampling clock (which can be easily done, e.g., with a simple counter), since the receiver may need to know, e.g., how many samples to extract for a complete frame. Because the transmitted symbol clock is locked to an atomic clock (e.g., Global Positioning System, GPS, reference clock), by locking to the transmitter clock, the receiver may have a good estimate of the relative time delay or offset from the start of a frame to any point in the future. The relative time delay may be given by the number of sample clocks since the start of a frame times the sample clock period.

The second component of the synchronization of the real time clock within the receiver is associated with determining the current real time. The determination may be accomplished by sending signaling data in the preamble of the transmitted data. The signaling data includes the time synchronization information, including a time reference from the transmitter clock, the frame mode and, depending on the frame mode, frame length or frame time offset. When in frame aligned mode, the start of a frame happens on the 1 ms boundary. When in symbol aligned mode, the frame time offset identifies the offset between a preceding 1 ms boundary and the beginning of the frame. The receiver can determine the current time by knowing the time in sample clocks from the start of the frame until "now" (the present time), the time offset signaled in the preamble (if in symbol aligned mode), and the transmitted or signaled time reference (or reference time). After decoding the preamble of a frame, the receiver may identify the time synchronization information signaled in the preamble. The receiver may also look at its sample counter and know how many samples have occurred since the start of the frame. Therefore, the actual or real current time may be given, when in symbol aligned frame mode by:

$$\text{actual current time} = \text{signaled reference time} + \text{signaled frame time offset} + \text{calculated time since the start of frame till now} \quad (5)$$

In equation (5), the signaled reference time may be, e.g., monday 7:00 pm, the signaled frame time offset may be, e.g., 10 sample clocks*sample clock period, and the calculated time since the start of frame till now may be, e.g., 50000 sample clock*sample clock period.

When in time aligned frame mode, the actual current time may be given by:

$$\text{actual current time} = \text{signaled reference time} + \text{calculated time since the start of frame till now} \quad (6)$$

Using the information described above, the receiver can set or adjust the time of its internal clock appropriately. The accuracy of the receiver system or real time clock may not be as good as, for example, a local GPS time source, but may be accurate enough for multimedia presentation purposes. In particular, without additional processing, the receiver may not account for the transmit time, e.g., from the transmitter antenna to the receiver antenna, which may be on the order of, e.g., tens of milliseconds.

According to one aspect of the present disclosure, an apparatus 110 for transmitting a signal is provided including a modulator 114 operable to generate a signal by modulating data into a plurality of modulation symbols, the data including time synchronization information including one of a time offset parameter and a frame length parameter selected according to a frame length mode parameter, and a transmitter interface 115 coupled to the modulator 114 and operable to transmit the signal over a communication medium. The time offset parameter, frame length parameter and frame length mode parameter may be the L1B_time_offset, L1B_frame_length and L1B_frame_length_mode parameters, respectively. Other time synchronization information may include number of padding samples for the frame, time reference from transmitter clock, etc.

According to one embodiment of the apparatus, at least a portion of the data may be divided into frames. In one embodiment, the data may include signaling data and non-signaling data. In one embodiment, the time synchronization information may be included in the signaling data. In one embodiment the non-signaling data may be divided into sub-frames.

According to one embodiment of the apparatus, the time synchronization information may further include the frame length mode parameter.

According to one embodiment of the apparatus, the frame length mode parameter may indicate that a frame is one of a time aligned frame and a symbol aligned frame, the time offset parameter may indicate a time interval between a reference time value and a beginning of a first modulation symbol of the frame, and the frame length parameter may indicate a length of the frame.

According to one embodiment of the apparatus, the reference time value may be a closest time boundary value that is on or before the beginning of the first modulation symbol of the frame.

According to one embodiment of the apparatus, the time boundary value may be a multiple of one millisecond.

According to one embodiment of the apparatus, the data may include the time offset parameter when the frame length mode parameter indicates that the frame is symbol aligned.

According to one embodiment of the apparatus, the data may include the frame length parameter when the frame length mode parameter indicates that the frame is time aligned.

According to one embodiment of the apparatus, the time offset parameter may be a function of the sample rate.

According to one embodiment of the apparatus, the frame length parameter may be in units of five milliseconds.

According to one embodiment of the apparatus, the frame length mode parameter and one of the time offset parameter and the frame length parameter may be included in a preamble modulation symbol of the frame, the preamble including signaling data.

According to one embodiment, the apparatus may further include a channel encoder 113 coupled to the modulator and operable to channel encode the data prior to the modulator. The channel encoder 113 may be optional, bypassed or removed.

According to one embodiment of the apparatus, the modulator 114 may be a multi-carrier modulator operable to allocate the modulation symbols to a plurality of carriers.

According to one embodiment of the apparatus, the multi-carrier modulation may be orthogonal frequency division multiplex (OFDM).

According to one embodiment, the apparatus may further include a source 111, 300 coupled to the modulator 114 and operable to provide the data. The source 111, 300 may be remotely coupled to modulator 114. The source 111, 300 may be optional, bypassed or removed. For example, the data may be stored in modulator 114. For example, the data may be stored in a hard drive in modulator 114.

According to one embodiment of the apparatus, the signal may be compliant with an Advanced Television System Committee standard. In one embodiment, the signal may be compliant with the ATSC 3.0 standard.

According to one aspect of the present disclosure, an apparatus 120 for receiving a signal is provided including a receiver interface 125 operable to receive a signal over a communication medium, and a demodulator 124, 410 coupled to the receiver interface 125 and operable to demodulate the signal to generate a plurality of demodulated symbols, the demodulated symbols including data, the data including time synchronization information including one of a time offset parameter and a frame length parameter selected according to a frame length mode parameter. In one embodiment, the time synchronization information may be used to prevent disruption for audio and video services at the receiver, since an underflow or overflow in a buffer may cause disruption in the user experience. In one embodiment, the time synchronization information may be information used to synchronize data between the transmitter and the receiver. In one embodiment, the time synchronization information may be information used to recover a frame of data. The time offset parameter, frame length parameter and frame length mode parameter may be the L1B_time_offset, L1B_frame_length and L1B_frame_length_mode parameters, respectively. Other time synchronization information may include number of padding samples for the frame, time reference from transmitter clock, etc.

According to one embodiment of the apparatus, at least a portion of the data may be divided into frames. In one embodiment, the data may include signaling data and non-signaling data. In one embodiment, the time synchronization information may be included in the signaling data. In one embodiment, the non-signaling data may be divided into sub-frames.

According to one embodiment of the apparatus, the time synchronization information may further include the frame length mode parameter.

According to one embodiment of the apparatus, the frame length mode parameter may indicate that a frame of data is one of a time aligned frame and a symbol aligned frame, the time offset parameter may indicate a time interval between a reference time value and a beginning of a first modulation symbol of the frame, and the frame length parameter may indicate a length of the frame.

According to one embodiment of the apparatus, the reference time value may be a closest time boundary value that is on or before the beginning of the first modulation symbol of the frame.

According to one embodiment of the apparatus, the time boundary value may be a multiple of one millisecond.

According to one embodiment of the apparatus, the data may include the time offset parameter when the frame length mode parameter indicates that the frame is symbol aligned.

According to one embodiment of the apparatus, the data may include the frame length parameter when the frame length mode parameter indicates that the frame is time aligned.

According to one embodiment of the apparatus, the time offset parameter may be a function of the sample rate.

According to one embodiment of the apparatus, the frame length parameter may be in units of five milliseconds.

According to one embodiment of the apparatus, the frame length mode parameter and one of the time offset parameter and the frame length parameter may be included in a preamble modulation symbol of the frame, the preamble including signaling data.

According to one embodiment, the apparatus may further include a channel decoder 123, 420 coupled to the demodulator (124) and operable to channel decode the data after the demodulator. The channel decoder 123, 420 may be optional, bypassed or removed.

According to one embodiment of the apparatus, the demodulator 124 may be a multi-carrier demodulator operable to demodulate the signal from a plurality of carriers.

According to one embodiment of the apparatus, the multi-carrier modulation may be orthogonal frequency division multiplex (OFDM).

According to one embodiment, the apparatus may further include a signaling data detector 422 coupled to the demodulator 124, 410 and operable to detect the data from the plurality of demodulated symbols and recover the time synchronization information. In one embodiment, the signaling data detector 422 may be inside the demodulator 124, 410. In one embodiment, the signaling data detector 422 may be inside the channel decoder 123, 420.

According to one embodiment of the apparatus, the signal may be compliant with an Advanced Television System Committee standard. In one embodiment, the signal may be compliant with ATSC 3.0.

According to one embodiment, the apparatus may further include a display 121 coupled to said demodulator 124 and operable to display said data. The display may be optional, bypassed or removed.

According to one embodiment, the apparatus may further include a storage device coupled to said demodulator 124 and operable to store said data. The storage device may be, for example, a hard disk drive. The storage device may be optional or removed.

Figure 9:
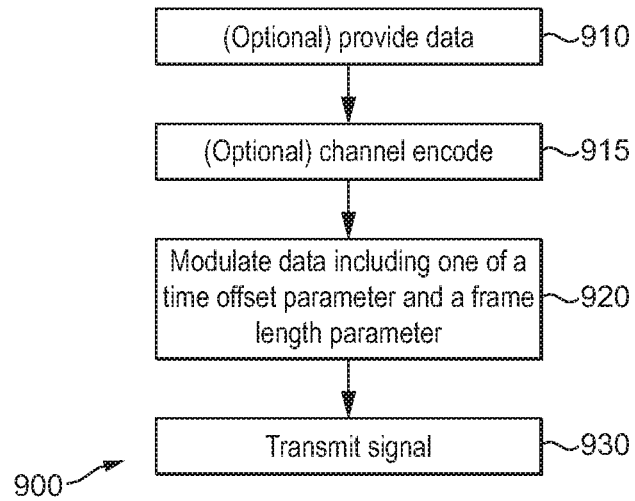
FIG. 9 illustrates a flowchart of a method of transmitting a signal according to the present disclosure.

FIG. 9 illustrates a flowchart 900 of a method of transmitting a signal according to one aspect of the present disclosure. The method 900 may be performed by, e.g., transmitter 110. Initially, the method includes, at step 920, modulating data into a plurality of modulation symbols to generate a signal, the data including time synchronization information including one of a time offset parameter and a frame length parameter selected according to a frame length mode parameter. The step of modulating 920 may be performed by, e.g., modulator 111. Finally, at step 930, the method includes transmitting the signal over a communication medium. The step of transmitting 930 may be performed by, e.g., transmitter interface 115. The time offset parameter, frame length parameter and frame length mode parameter may be the L1B_time_offset, L1B_frame_length and LIB_frame_length_mode parameters, respectively. Other time synchronization information may include number of padding samples for the frame, time reference from transmitter clock, etc.

According to one embodiment of the method, at least a portion of the data may be divided into frames. In one embodiment, the data may include signaling data and non-signaling data. In one embodiment, the time synchronization information may be included in the signaling data. In one embodiment, the non-signaling data may be divided into sub-frames.

According to one embodiment of the method, the time synchronization information may further include the frame length mode parameter.

According to one embodiment of the method, the frame length mode parameter may indicate that a frame is one of a time aligned frame and a symbol aligned frame, the time offset parameter may indicate a time interval between a reference time value and a beginning of a first modulation symbol of the frame, and the frame length parameter may indicate a length of the frame.

According to one embodiment of the method, the reference time value may be a closest time boundary value that is on or before the beginning of the first modulation symbol of the frame.

According to one embodiment of the method, the time boundary value may be a multiple of one millisecond.

According to one embodiment of the method, the data may include the time offset parameter when the frame length mode parameter indicates that the frame is symbol aligned.

According to one embodiment of the method, the data may include the frame length parameter when the frame length mode parameter indicates that the frame is time aligned.

According to one embodiment of the method, the time offset parameter may be a function of the sample rate.

According to one embodiment of the method, the frame length parameter may be in units of five milliseconds.

According to one embodiment of the method, the frame length mode parameter and one of the time offset parameter and the frame length parameter may be included in a preamble modulation symbol of the frame, the preamble including signaling data.

According to one embodiment, the method may further include, at step 915, channel encoding the data prior to modulating. The step of channel encoding 915 may be performed by, e.g., channel encoder 113. The step of channel encoding may optional, bypassed or removed.

According to one embodiment of the method, the modulating may be a multi-carrier modulating further including allocating the modulation symbols to a plurality of carriers.

According to one embodiment of the method, the multi-carrier modulation may be orthogonal frequency division multiplex (OFDM).

According to one embodiment, the method may further include, at step 910, providing the data prior to modulating. The step of providing may be performed, e.g., by source 111, 300. The step of providing may be optional, bypassed or removed. The source of data (e.g., 111, 300) may be remote. The source of data may be optional, bypassed or removed. For example, the data may be stored in a modulator (e.g., 114) performing the step of modulating 920. For example, the data may be stored in a hard drive in a modulator performing the step of modulating 920 (e.g., 114).

According to one embodiment of the method, the signal may be compliant with an Advanced Television System Committee standard. In one embodiment, the signal may be compliant with the ATSC 3.0 standard.

Figure 10:
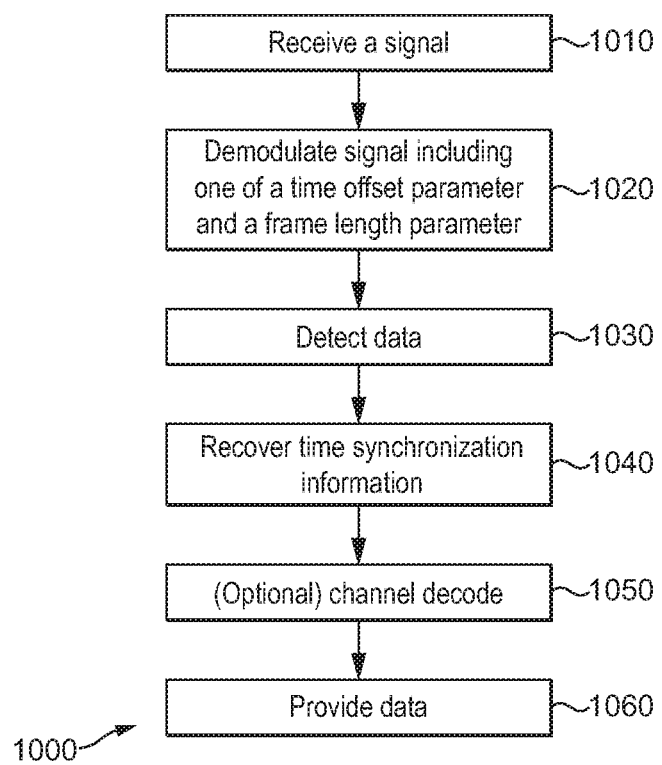
FIG. 10 illustrates a flowchart of a method receiving a signal according to the present disclosure.

FIG. 10 illustrates a flowchart 1000 of a method of receiving a signal according to one aspect of the present disclosure. The method 1000 may be performed by, e.g., receiver 120. Initially, the method includes, at step 1010, receiving a signal over a communication medium. The step of receiving may be performed by, e.g., receiver interface 125. Then, at step 1020, the method includes demodulating the signal to generate a plurality of demodulated symbols, the demodulated symbols including data, the data including time synchronization information including one of a time offset parameter and a frame length parameter selected according to a frame length mode parameter. In one embodiment, the time synchronization information may be used to prevent disruption for audio and video services at the receiver, since an underflow or overflow in a buffer may cause disruption in the user experience. In one embodiment, the time synchronization information may be information used to synchronize data between the transmitter and the receiver. In one embodiment, the time synchronization information may be used to recover a frame of data. The time offset parameter, frame length parameter and frame length mode parameter may be the L1B_time_offset, L1B_frame_length and LIB_frame_length_mode parameters, respectively. Other time synchronization information may include number of padding samples for the frame, time reference from transmitter clock, etc.

According to one embodiment of the method, at least a portion of the data may be divided into frames. In one embodiment, the data may include signaling data and non-signaling data. In one embodiment, the time synchronization information may be included in the signaling data. In one embodiment, the non-signaling data may be divided into sub-frames.

According to one embodiment of the method, the time synchronization information may further include the frame length mode parameter.

According to one embodiment of the method, the frame length mode parameter may indicate that a frame of data is one of a time aligned frame and a symbol aligned frame, the time offset parameter indicates a time interval between a reference time value and a beginning of a first modulation symbol of the frame, and the frame length parameter indicates a length of the frame.

According to one embodiment of the method, the reference time value may be a closest time boundary value that is on or before the beginning of the first modulation symbol of the frame.

According to one embodiment of the method, the time boundary value may be a multiple of one millisecond.

According to one embodiment of the method, the data may include the time offset parameter when the frame length mode parameter indicates that the frame is symbol aligned.

According to one embodiment of the method, the data may include the frame length parameter when the frame length mode parameter indicates that the frame is time aligned.

According to one embodiment of the apparatus, the time offset parameter may be a function of the sample rate.

According to one embodiment of the method, the frame length parameter may be in units of five milliseconds.

According to one embodiment of the method, the frame length mode parameter and one of the time offset parameter and the frame length parameter may be included in a preamble modulation symbol of the frame, the preamble including signaling data.

According to one embodiment, the method may further include, at step 1050, channel decoding the data after demodulating 1020. The step of channel decoding 1050 may be performed by, e.g., channel decoder 123 or 420. The step of channel decoding 1050 may be optional, bypassed or removed.

According to one embodiment of the method, the demodulating 1020 may be multi-carrier demodulating further including demodulating the signal from a plurality of carriers.

According to one embodiment of the method, the multi-carrier modulation may be orthogonal frequency division multiplex (OFDM).

According to one embodiment, the method may further include, at step 1030, detecting the data from the plurality of demodulated symbols, and, at step 1040, recovering the time synchronization information. The steps of detecting 1030 and recovering 1040 may be performed by, e.g., signaling data detector 422.

According to one embodiment of the method, the signal may be compliant with an Advanced Television System Committee standard. In one embodiment, the signal may be compliant with ATSC 3.0.

According to one embodiment, the method may further include, at step 1060, providing said data. The data may be provided for display by, e.g., display 121. The data may also be provided for storage, e.g., in a hard disk drive (e.g., in a digital video recorder).

Any of the embodiments of the methods 500, 600, 900 and 1000 of FIGS. 5, 6, 9 and 10, respectively, may be implemented and executed by a computing system according to an aspect of the present disclosure. The computing system/environment may include a processor and at least one (and preferably more than one) I/O interface coupled to the processor. The I/O interface can be wired or wireless and, in the wireless implementation is pre-configured with the appropriate wireless communication protocols to allow the computing environment to operate on a global network (e.g., internet) and communicate with other computers or servers (e.g., cloud based computing or storage servers) so as to enable the present disclosure to be provided, for example, as a Software as a Service (SAAS) feature remotely provided to end users. One or more memories and/or storage devices (Hard Disk Drive, HDD) may also be provided coupled to the processor within the computing environment. The computing environment may be used to implement a node or device, and/or a controller or server that operates the storage system. The computing environment may be, but is not limited to, desktop computers, cellular phones, smart phones, phone watches, tablet computers, personal digital assistant (PDA), netbooks, laptop computers, set-top boxes or general multimedia content receiver and/or transmitter devices. The memory and/or storage does not need to be collocated with the processor and/or I/) interfaces.

According to one aspect of the present disclosure, an apparatus for transmitting a signal is described, the apparatus including a processor in communication with at least one input/output interface; and at least one memory in communication with the processor, the processor being configured to perform any of the embodiments of the method 900 of transmitting a signal.

According to one aspect of the present disclosure, an apparatus for transmitting a signal is provided including a transmitter 110 operable to generate and transmit a signal over a communication medium, the signal including data, the data including time synchronization information including one of a time offset parameter and a frame length parameter selected according to a frame length mode parameter. The time offset parameter, frame length parameter and frame length mode parameter may be the L1B_time_offset, L1B_frame_length and LIB_frame_length_mode parameters, respectively. Other time synchronization information may include number of padding samples for the frame, time reference from transmitter clock, etc.

According to one aspect of the present disclosure, an apparatus for receiving a signal is described, the apparatus including a processor in communication with at least one input/output interface; and at least one memory in communication with the processor, the processor being configured to perform any of the embodiments of the method 1000 of receiving a signal.

According to one aspect of the present disclosure, an apparatus for receiving a signal is described, the apparatus including a receiver 120 operable to receive a signal over a communication medium, the signal including data, the data including time synchronization information including one of a time offset parameter and a frame length parameter selected according to a frame length mode parameter. In one embodiment, the time synchronization information may be used to prevent disruption for audio and video services, since an underflow or overflow in a buffer may cause disruption in the user experience. In one embodiment, the time synchronization information may be information used to synchronize data between the transmitter and the receiver. In one embodiment, the time synchronization information may be used to recover a frame of data. The time offset parameter, frame length parameter and frame length mode parameter may be the L1B_time_offset, L1B_frame_length and LIB_frame_length_mode parameters, respectively. Other time synchronization information may include number of padding samples for the frame, time reference from transmitter clock, etc.

According to one aspect of the present disclosure, an electromagnetic signal including data is provided, the data divided into frames and including time synchronization information including one of a time offset parameter and a frame length parameter selected according to a frame length mode parameter. The description and embodiments of the electromagnetic signal, data, time synchronization information, time offset parameter, frame length parameter and frame length mode parameter are as previously described for the apparatuses 110, 120 and methods 900, 1000 for transmitting and receiving a signal.

It is important to note that one or more of the elements in the methods 500, 600, 900 and 1000 may be combined, performed in a different order, or excluded in some embodiments while still implementing the aspects of the present disclosure.

Any of the embodiments of the methods 500, 600, 900 and 1000 of FIGS. 5, 6, 9 and 10, respectively, may be implemented as a computer program product comprising computer executable instructions which may be executed by a processor. The computer program product having the computer-executable instructions may be stored in the respective non-transitory computer-readable storage media of the respective above mentioned devices.

According to one aspect of the present disclosure, a non-transitory computer-readable program product is provided including program code instructions for performing any of the embodiments of the method 900 of transmitting a signal.

According to one aspect of the present disclosure, a non-transitory computer-readable program product is provided including program code instructions for performing any of the embodiments of the method 1000 of receiving a signal.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium may be, for example, but is not limited to, an electronic, magnetic, optical, electromagnetic, infrared, or semiconductor system, apparatus, or device, or any suitable combination of the foregoing.

It is to be appreciated that the following list, while providing more specific examples of computer-readable storage mediums to which the present disclosure may be applied, is merely an illustrative and not exhaustive listing as is readily appreciated by one of ordinary skill in the art. The list of examples includes a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing. Location of the storage/memory may be different from location of other functions in the system, e.g., processor.

According to one aspect of the present disclosure, a computer-readable storage medium carrying a software program is provided including program code instructions for performing any of the embodiments of the method 900 of transmitting a signal. The computer-readable storage medium may be non-transitory or transitory.

According to one aspect of the present disclosure, a computer-readable storage medium carrying a software program is provided including program code instructions for performing any of the embodiments of the method 1000 of receiving signal. The computer-readable storage medium may be non-transitory or transitory.

It is to be appreciated that the various features shown and described are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims. For example, although illustrated in the context of separate functional elements, the various functional elements of a transmitter and/or receiver may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of steps. In addition, the present disclosure may apply to other multi-carrier modulation systems besides OFDM, e.g., discrete multi-tone (DMT) or digital subscriber line (DSL), and to other types of single-carrier or multi-carrier pre-existing or legacy systems besides 8-VSB, e.g., single carrier QAM modulation. Further, the present disclosure is applicable to other types of communications systems, e.g., Wireless-Fidelity (Wi-Fi), cellular, cable, satellite, etc. Indeed, the inventive concept is also applicable to stationary or mobile receivers. It is therefore to be understood that numerous modifications may be made to the illustrative embodiments and that other arrangements may be devised without departing from the scope of the present disclosure.

The invention claimed is:

1. An apparatus for transmitting a signal comprising:
   a modulator that generates a signal by modulating data into a plurality of modulation symbols, said data divided into frames, and said data comprising time synchronization information available for two modes of frame generation, wherein the time synchronization information includes
   a frame length mode parameter indicating one of said two modes, and
   one of a time offset parameter and a frame length parameter selected according to the frame length mode parameter; and
   a transmitter interface that transmits said signal over a communication medium;
   wherein the time synchronization information is used to adjust a system clock associated with a receiver of said signal.

2. The apparatus according to claim 1 wherein said frame length mode parameter indicates that a frame is one of a time aligned frame and a symbol aligned frame, said time offset parameter indicates a time interval between a reference time value and a beginning of a first modulation symbol of the frame, and said frame length parameter indicates a length of the frame.

3. The apparatus according to claim 2 wherein the reference time value is a closest time boundary value that is on or before the beginning of the first modulation symbol of the frame.

4. The apparatus according to claim 3 wherein the time boundary value is a multiple of one millisecond.

5. The apparatus according to claim 2 wherein the data includes the time offset parameter when the frame length mode parameter indicates that the frame is symbol aligned.

6. The apparatus according to claim 2 wherein the data includes the frame
length parameter when the frame length mode parameter indicates that the frame is time aligned.

7. The apparatus according to claim 1 wherein the frame length parameter is in units of five milliseconds.

8. The apparatus according to claim 1 wherein the frame length mode parameter and one of the time offset parameter and the frame length parameter are included in a preamble modulation symbol of said frame, said preamble comprising signaling data.

9. The apparatus according to claim 1 further comprising:
a channel encoder for channel encoding said data prior to the modulator.

10. The apparatus according to claim 1 wherein the modulator is a multicarrier modulator that allocates said modulation symbols to a plurality of carriers.

11. The apparatus according to claim 10 wherein the multi-carrier modulation is orthogonal frequency division multiplex (OFDM).

12. The apparatus according to claim 1 further comprising:
a source that provides said data.

13. The apparatus according to claim 1 wherein said signal is compliant with an Advanced Television System Committee standard.

14. A method of transmitting a signal comprising:
modulating data into a plurality of modulation symbols to generate a signal,
said data divided into frames and comprising time synchronization information available for two modes of frame generation, wherein the time synchronization information includes
a frame length mode parameter indicating one of said two modes, and
one of a time offset parameter and a frame length parameter selected according to the frame length mode parameter; and
transmitting said signal over a communication medium;
wherein the time synchronization information is used to adjust a system clock associated with a receiver of said signal.

15. The method according to claim 14 wherein said frame length mode parameter indicates that a frame is one of a time aligned frame and a symbol aligned frame, said time offset parameter indicates a time interval between a reference time value and a beginning of a first modulation symbol of the frame, and said frame length parameter indicates a length of the frame.

16. The method according to claim 15 wherein the reference time value is a closest time boundary value that is on or before the beginning of the first modulation symbol of the frame.

17. The method according to claim 16 wherein the time boundary value is a multiple of one millisecond.

18. The method according to claim 15 wherein the data includes the time offset parameter when the frame length mode parameter indicates that the frame is symbol aligned.

19. The method according to claim 15 wherein the data includes the frame
length parameter when the frame length mode parameter indicates that the frame is time aligned.

20. The method according to claim 14 wherein the frame length parameter is in units of five milliseconds.

21. The method according to claim 14 wherein the frame length mode parameter and one of the time offset parameter and the frame length parameter are included in a preamble modulation symbol of the frame, said preamble comprising signaling data.

22. The method according to claim 14 further comprising:
channel encoding said data prior to modulating.

23. The method according to claim 14 wherein the modulator is a multi-carrier modulator that allocates said modulation symbols to a plurality of carriers.

24. The method according to claim 23 wherein the multi-carrier modulation is orthogonal frequency division multiplex (OFDM).

25. The method according to claim 14 further comprising:
a source that provides said data.

26. The method according to claim 14 wherein said signal is compliant with an Advanced Television System Committee standard.

27. An apparatus for receiving a signal comprising:
a receiver interface that receives a signal over a communication medium; and
a demodulator that demodulates said signal to generate a plurality of demodulated symbols, said demodulated symbols comprising data divided into frames, said data comprising time synchronization information available for two modes of frame generation, wherein the time synchronization information includes a frame length mode parameter indicating one of said two modes, and one of a time offset parameter and a frame length parameter selected according to the frame length mode parameter,
said time synchronization information used to recover a frame of data;
wherein the time synchronization information is used to adjust a system clock associated with the receiver interface.

28. The apparatus according to claim 27 wherein said frame length mode parameter indicates that a frame of data is one of a time aligned frame and a symbol aligned frame, said time offset parameter indicates a time interval between a reference time value and a beginning of a first modulation symbol of the frame, and said frame length parameter indicates a length of the frame.

29. The apparatus according to claim 28 wherein the reference time value is a closest time boundary value that is on or before the beginning of the first modulation symbol of the frame.

30. The apparatus according to claim 29 wherein the time boundary value is a multiple of one millisecond.

31. The apparatus according to claim 29 wherein the data includes the time offset parameter when the frame length mode parameter indicates that the frame is symbol aligned.

32. The apparatus according to claim 28 wherein the data includes the frame length parameter when the frame length mode parameter indicates that the frame is time aligned.

33. The apparatus according to claim 27 wherein the frame length parameter is in units of five milliseconds.

34. The apparatus according to claim 27 wherein said frame length mode parameter and one of the time offset parameter and the frame length parameter are included in a preamble modulation symbol of the frame, said preamble comprising signaling data.

35. The apparatus according to claim 27 further comprising:
　a channel decoder that channel decoding said data after the demodulator.

36. The apparatus according to claim 27 wherein the demodulator is a multicarrier demodulator that demodulates the signal from a plurality of carriers.

37. The apparatus according to claim 36 wherein the multi-carrier modulation is orthogonal frequency division multiplex (OFDM).

38. The apparatus according to claim 27 further comprising:
　a signaling data detector that detects said data from said plurality of demodulated symbols and recovers the time synchronization information.

39. The apparatus according to claim 27 wherein said signal is compliant with an Advanced Television System Committee standard.

40. A method for receiving a signal at a receiver comprising:
　receiving a signal over a communication medium; and
　demodulating said signal to generate a plurality of demodulated symbols, said demodulated symbols comprising data divided into frames, said data comprising time synchronization information available for two modes of frame generation, wherein the time synchronization information includes a frame length mode parameter indicating one of said two modes, and one of a time offset parameter and a frame length parameter selected according to the frame length mode parameter, said time synchronization information used to recover a frame of data;
　further wherein the time synchronization information is used to adjust a system clock associated with the receiver.

41. The method according to claim 40 wherein said frame length mode parameter indicates that a frame of data is one of a time aligned frame and a symbol aligned frame, said time offset parameter indicates a time interval between a reference time value and a beginning of a first modulation symbol of the frame, and said frame length parameter indicates a length of the frame.

42. The method according to claim 41 wherein the reference time value is a closest time boundary value that is on or before the beginning of the first modulation symbol of the frame.

43. The method according to claim 42 wherein the time boundary value is a multiple of one millisecond.

44. The method according to claim 41 wherein the data includes the time offset parameter when the frame length mode parameter indicates that the frame is symbol aligned.

45. The method according to claim 41 wherein that data includes the frame length parameter when the frame length mode parameter indicates that the frame is time aligned.

46. The method according to claim 40 wherein the frame length parameter is in units of five milliseconds.

47. The method according to claim 40 wherein said frame length mode parameter and one of the time offset parameter and the frame length parameter are included in a preamble modulation symbol of the frame, said preamble comprising signaling data.

48. The method according to claim 40 further comprising:
　channel decoding said data after demodulating.

49. The method according to claim 40 wherein the demodulating is multicarrier demodulating that demodulates the signal from a plurality of carriers.

50. The method according to claim 49 wherein the multi-carrier modulation is orthogonal frequency division multiplex (OFDM).

51. The method according to claim 40 further comprising:
　detecting said data from said plurality of demodulated symbols; and
　recovering the time synchronization information.

52. The method according to claim 40 wherein said signal is compliant with an Advanced Television System Committee standard.

* * * * *